: 2,989,559
Patented June 20, 1961

2,989,559
CARBONYL-CONTAINING ORGANOPOLY-SILOXANES

James G. Marsden, Tonawanda, N.Y., assignor to Union Carbide Corporation, a corporation of New York
No Drawing. Filed June 27, 1958, Ser. No. 744,903
9 Claims. (Cl. 260—448.2)

This invention relates to novel organo-functional silicon compounds, and to processes for their production. More particularly, this invention is concerned with novel organo-functional silicon compounds produced by the addition of an aldehyde to a siloxane containing at least one olefinically unsaturated hydrocarbon radical, and to processes for their production.

The preparation of silicon compounds having both organo-functional and silicon-functional groups is highly desirable since it permits the resulting products to have organic reactivity in addition to silicon reactivity. One method by which it would appear feasible to prepare such compounds would be by the addition of compounds containing a reactive hydrogen atom to unsaturated silanes which contain hydrolyzable groups, such as alkoxy or halogen groups, bonded to the silicon atom thereof. Attempts have been made to produce organo-functional silicon compounds by the above method; however, it has been found that the addition reaction will not occur. Thus, attempts to add aldehydes to unsaturated hydrolyzable silanes, such as methylvinyldichlorosilane and methylvinyldiethoxysilane, have been unsuccessful. Although aldehydes have been successfully added to trialkylvinylsilanes, the resulting silanes are non-functional with respect to silicon, and cannot be used to prepare silicon polymers.

According to the process of this invention, organo-functional siloxanes which contain carbonyl groups attached to silicon through divalent saturated hydrocarbon radicals can be produced by forming a mixture of an aldehyde, a siloxane containing an olefinically unsaturated hydrocarbon radical bonded to at least one silicon atom thereof, and a catalyst, and heating the mixture to a temperature sufficiently elevated to cause the aldehyde and siloxane to react to produce said organo-functional siloxanes.

The organo-functional siloxanes produced by the process of this invention contain at least one unit depicted by the formula:

(1) 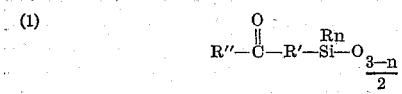

wherein R" is a hydrogen atom, an alkyl radical, such as methyl, ethyl, propyl and the like, an aryl radical, such as phenyl, naphthyl, tolyl and the like, or a hydroxy-substituted aryl radical, such as hydroxyphenyl and the like; R' is a divalent saturated hydrocarbon radical containing from 2 to 6 carbon atoms, such as ethylene, propylene, butylene, cyclohexylene and the like; R is an alkyl radical, such as methyl, ethyl, propyl and the like, or an aryl radical, such as phenyl, naphthyl, tolyl and the like; and $n$ is an integer having a value of from 0 to 2 inclusive. Such siloxanes can also contain one or more hydrocarbon-substituted siloxane units depicted by the formula:

(2) 

wherein R is an alkyl radical, such as methyl, ethyl, propyl and the like, or an aryl radical, such as phenyl, naphthyl, tolyl and the like, and $a$ is an integer having a value of from 1 to 3, inclusive.

Thus, the organo-functional siloxanes which can be prepared in accordance with this invention can be composed of repeating units of the structure depicted by Formula 1, or such siloxanes can be composed of one or more units depicted by Formula 1 and one or more units depicted by Formula 2.

The siloxane starting materials employed in the instant process contain at least one unit depicted by the formula:

(3) 

wherein R and $n$ are as above defined, and R''' is a mono-olefinically unsaturated hydrocarbon radical containing from 2 to 6 carbon atoms, such as vinyl, allyl, cyclohexenyl and the like. Preferably, the olefinically unsaturated radicals are terminally unsaturated, straight-chain alkenyl radicals. In such case, the siloxane starting materials contain at least one unit depicted by the formula:

(4) 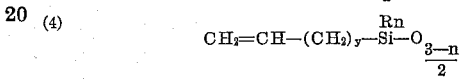

wherein R and $n$ are as above defined, and $y$ is an integer having a value of from 0 to 4, inclusive. Especially preferred as starting materials are those siloxanes in which the alkenyl radicals attached to silicon are vinyl and/or allyl radicals.

In addition to containing units depicted by Formulas 3 and 4, the siloxane starting materials can also contain one or more units depicted by Formula 2. Thus, the siloxane starting materials employed can be composed of repeating units of the structure depicted by Formula 3, or such siloxanes can be composed of one or more units depicted by Formula 3 and one or more units depicted by Formula 2. Preferably, the starting siloxanes are composed of repeating units of the structure depicted by Formula 4, or are composed of one or more units depicted by Formula 4 and one or more units depicted by Formula 2.

Various siloxane starting materials suitable for use in my invention can be prepared by the addition of hydrolyzable silanes containing a single hydrogen atom bonded directly to silicon, to hydrocarbons containing an acetylenic linkage, to produce hydrolyzable alkenyl silanes, followed by hydrolysis of said silanes to produce cyclic, linear or cross-linked siloxanes (depending upon the number of hydrolyzable groups present). By way of illustration, methylhydrogendichlorosilane can be added to acetylene to produce methylvinyldichlorosilane, which in turn can be hydrolyzed to produce cyclic or linear methylvinylsiloxanes.

Cyclic methylvinylsiloxanes contain at least three, and can contain up to six or more, methylvinylsiloxy units per molecule. High molecular weight linear siloxanes containing methylvinylsiloxy units can be prepared by equilibrating cyclic methylvinylsiloxanes, either alone, or with other cyclic siloxanes, such as the cyclic trimers and tetramers of dimethylsiloxane, methylphenylsiloxane and like compounds. Relatively low molecular weight linear siloxanes containing methylvinylsiloxy units can be prepared by equilibrating cyclic methylvinylsiloxanes with chain end-blocking compounds, such as hexamethyldisiloxane and the like, or with mixtures of such end-blocking compounds and cyclic siloxanes.

Cross-linked siloxanes can be prepared by the hydrolysis and condensation of trifunctional silanes, either alone, or in combination with other hydrolyzable silanes.

Typical siloxane starting materials which can be employed in the process of this invention are tris(trimethylsiloxy)vinylsilane, heptamethylvinylcyclotetrasiloxane and dimethylsiloxane oils containing methylvinylsiloxy units.

The aldehydes employed in the process of this invention have the general formula:

(5)
$$R''-\overset{\overset{O}{\|}}{C}-H$$

wherein R'' is a hydrogen atom, an alkyl radical, such as methyl, ethyl, propyl and the like, an aryl radical, such as phenyl, naphthyl, tolyl and the like, or a hydroxy-substituted aryl radical, such as hydroxyphenyl and the like.

The reaction which takes place when the siloxane starting materials are reacted with an aldehyde in accordance with my invention may be illustrated by the following graphic equation which depicts the reaction between an aldehyde and my preferred starting siloxanes.

$$CH_2=CH-(CH_2)_y-\underset{}{\overset{R_n}{Si}}-O_{\frac{3-n}{2}}+R''\overset{\overset{O}{\|}}{C}H \longrightarrow$$

$$R''-\overset{\overset{O}{\|}}{C}-CH_2-CH_2-(CH_2)_y-\underset{}{\overset{R_n}{Si}}-O_{\frac{3-n}{2}}$$

wherein R'', R, y and n are as above defined. Thus, my process has been used to prepare compounds such as tris-(trimethylsiloxy)-3-oxo-butylsilane from acetaldehyde and tris(trimethylsiloxy)-vinylsilane. This may be illustrated by the following graphic equation:

$$[(CH_3)_3SiO]_3-Si-CH=CH_2+CH_3\overset{\overset{O}{\|}}{C}H \longrightarrow$$

$$[(CH_3)_3SiO]_3-Si-CH_2-CH_2-\overset{\overset{O}{\|}}{C}-CH_3$$

The relative amounts of reactants employed is not narrowly critical, and can vary over a wide range. From a practical standpoint, particularly good results are obtained when stoichiometric amounts of reactants are employed. An excess of either reactant can also be advantageously employed; however, no commensurate advantage is obtained thereby.

The catalysts which may be employed in the process of this invention include ultra-violet light, organic peroxides and azo compounds. Specific examples of organic peroxide catalysts operative herein include ditertiarybutyl peroxide, dibenzoyl peroxide, dicumyl peroxide, diacetyl peroxide, and tertiarybutyl peracetate. Specific examples of azo compounds operative herein include α-α'-azodiisobutyronitrile and 2,2'-dicyanoazobenzene.

The concentration of materials employed as catalysts is not narrowly critical, and may vary widely. However, the catalyst is most suitably employed in concentrations of from about 1% to 10%, preferably from about 2% to 8%, by weight of the siloxane employed.

Without wishing to be bound by any one particular theory, it is believed that the reaction proceeds by a free radical mechanism, as the catalysts employed are known catalysts for reactions involving unsaturated organic compounds which proceed by a free-radical mechanism. Thus, the catalysts useful in my process can be termed free radical addition catalysts.

In the practice of the process of this invention, the siloxane starting materials should be substantially free of substituents which inhibit free radical addition reactions. Thus, siloxanes containing such radicals as halogen, alkoxy, carboxyalkyl and the like attached to silicon cannot be employed as starting materials in the instant process.

The term "substantially free" as employed above means that the siloxanes may contain traces of undesirable substituents such as are normally present in commercially available siloxanes. These trace amounts do not interfere with the reaction.

The temperature employed in the process of the instant invention is not narrowly critical, and vary widely. Thus, temperatures ranging from as low as 50° C. to as high as 180° C. and above can be employed. In general, the more active the catalyst, the lower the temperature required to effect reaction. For example, in the case of an active catalyst, such as dibenzoyl peroxide, temperatures of from 50° C. to 100° C. can be advantageously employed. In the case of a less active catalyst, such as ditertiarybutyl peroxide, temperatures of from 100° C. to 180° C., preferably from 130° C. to 150° C., can be effectively employed. Preferably, active catalysts are employed which decompose at temperatures sufficiently low to minimize cross-linking of the siloxane through the unsaturated radicals.

The pressure employed in the process of the instant invention is not critical, and reaction may be effected at any desired pressure. However, when reaction is effected at temperatures above the boiling point of the reactants, it is preferable to carry out the reaction in a closed vessel in order to maintain the reactants in contact.

Although the manner of effecting reaction is not critical, in a preferred embodiment of this invention, the catalyst is first dissolved in the siloxane, and the resulting solution gradually added to the aldehyde maintained at a temperature sufficiently elevated to effect reaction.

The novel organo-functional siloxanes prepared in accordance with my invention can be graphically depicted as having molecules containing at least one unit of the formula:

(6)
$$R''-\overset{\overset{O}{\|}}{C}-R'-\underset{}{\overset{R_m}{Si}}-O_{\frac{3-m}{2}}$$

wherein R'' is an alkyl radical, such as methyl, ethyl, propyl and the like, an aryl radical, such as phenyl, naphthyl, tolyl and the like, or a hydroxy-subtsituted aryl radical, such as hydroxyphenyl and the like; R' is a divalent saturated hydrocarbon radical containing from 2 to 6 carbon atoms, such as ethylene, propylene, butylene, cyclohexylene and the like; R is an alkyl radical, such as methyl, ethyl, propyl and the like, or an aryl radical, such as phenyl, naphthyl, tolyl and the like; and m is an integer having a value of from 0 to 1, inclusive. Such siloxanes can also contain one or more hydrocarbon-substituted siloxane units depicted by the formula:

(7)
$$R_a-Si-O_{\frac{4-a}{2}}$$

wherein R is an alkyl radical, such as methyl, ethyl, propyl and the like, or an aryl radical, such as phenyl, naphthyl, tolyl and the like, and a is an integer having a value of from 1 to 3, inclusive.

Thus, the novel organo-functional siloxanes which can be prepared in accordance with the invention can be composed of repeating units of the structure depicted by Formula 6, or such siloxanes can be composed of one or more units depicted by Formula 6 and one or more units depicted by Formula 7.

Novel siloxane compounds which have been prepared include tris(trimethylsiloxy)-3-oxo-butylsilane, tris(trimethylsiloxy) - 3-oxo-4-ethylhexylsilane, tris(trimethylsiloxy)-3-oxo-3-phenylpropylsilane, and tris(trimethylsiloxy)-3-oxo-3-orthohydroxyphenylpropylsilane.

The ketonic siloxanes prepared in accordance with this invention contain both organo-functional (carbonyl) groups and silicon-functional (Si—O—Si) groups, and undergo the known reactions characteristic of such groups. By way of illustration, the siloxane linkages undergo equilibration reactions, and the carbonyl groups are useful in preparing ketone derivatives, such as oximes, azomethines, alcohols and the like. In addition, the carbonyl groups impart useful properties to the siloxane without impairing the properties normally associated with such compounds, such as thermal and hydrolytic stability. For example, ultra-violet absorption properties are imparted to siloxanes having carbonyl groups incorporated therein. Thus, when one mole of salicylaldehyde is added to one mole of tris-(trimethylsiloxy)vinylsilane by the process of the present invention, a ketone-containing siloxane having useful ultra-violet absorption properties is produced.

The following examples of my invention are set forth so that those skilled in the art may better understand my invention, and are by way of illustration only, and are not to be construed as limiting my invention in any manner.

EXAMPLE I

*Addition of alpha-ethylbutyraldehyde to tris(trimethylsiloxy)-vinylsilane*

One hundred and two-tenths (100.2) grams of alpha-ethylbutyraldehyde (1.0 mole), 96.6 grams of tris(trimethylsiloxy)vinylsilane (0.3 mole), and six (6) grams of ditertiarybutyl peroxide (6.2 percent catalyst of weight of siloxane) were charged to a 500 ml. round-bottom flask fitted with a reflux condenser and drying tube. The mixture was heated at its refluxing temperature (123–125° C.) for 3 hours. Following this, unreacted starting materials were stripped under reduced pressure. Ten and two-tenths (10.2) grams of tris(trimethylsiloxy)-3-oxo-4-ethylhexylsilane $$[(CH_3)_3SiO]_3SiCH_2CH_2COCH(C_2H_5)CH_2CH_3$$

were recovered (8 percent yield). This material was identified by its infra-red absorption spectrum.

EXAMPLE II

*Addition of benzaldehyde to tris(trimethylsiloxy)-vinylsilane*

Fifty-three (53) grams of benzaldehyde (0.5 mole) were placed in a 500 ml. round-bottom flask fitted with a reflux condenser, a drying tube, and a dropping funnel, and heated to 135° C. One hundred and sixty-one (161) grams of tris(trimethylsiloxy)vinylsilane (0.5 mole) containing 9.6 grams of ditertiarybutyl peroxide in solution (5.95 percent catalyst of weight of siloxane) were added over a one (1) hour period, with the temperature gradually rising to 160° C. The reaction mixture was heated at 160° C. for two (2) hours after the addition was complete. The reaction mixture was then fractionated in a short Vigreaux column. Sixty-six and nine-tenths (66.9) grams of tris(trimethylsiloxy)-3-oxo-3-phenylpropylsilane $$[(CH_3)_3SiO]_3SiCH_2CH_2COC_6H_5$$

were recovered (31 percent yield). This material had a boiling point of 115–170° C. at 0.2 mm. Hg, and was identified by its infra-red absorption spectrum and chemical analysis.

ANALYSIS

| Element | Found, Percent | Calculated, Percent |
|---|---|---|
| C | 49.6 | 50.4 |
| H | 8.3 | 8.4 |
| Si | 26.2 | 26.2 |

EXAMPLE III

*Addition of salicylaldehyde to tris(trimethylsiloxy)-vinysilane*

Sixty-one (61) grams of salicylaldehyde (0.5 mole) were placed in a 500 ml. round-bottom flask fitted with a reflux condenser, a drying tube, and a dropping funnel, and heated to 135° C. One hundred and nine and one-half (109.5) grams of tris(trimethylsiloxy)vinylsilane (0.345 mole) containing ten (10) grams of ditertiarybutyl peroxide in solution (8.76 percent catalyst of weight of siloxane) were added over a one (1) hour period, with the temperature gradually rising to 145° C. The reaction mixture was heated at 145° C. for 1½ hours after the addition was complete. The reaction mixture was then fractionated in a short Vigreaux column. Twenty-six and two-tenths (26.2) grams of tris(trimethylsiloxy)-3-oxo-3-ortho-hydroxyphenylpropylsilane $$[(CH_3)_3SiO]_3SiCH_2CH_2COC_6H_4OH$$

were recovered (17.2 percent yield). A considerable degree of hydrogen bonding was noted between the hydroxy and carbonyl groups in the infra-red absorption spectrum. This material had the following properties: B.P. 145–185° C. at 0.5 mm. Hg, $n_D^{25°}$ 1.4528, and was identified by its infra-red absorption spectrum and chemical analysis.

ANALYSIS

| Element | Found, Percent | Calculated, Percent |
|---|---|---|
| C | 48.4 | 48.6 |
| H | 8.2 | 8.1 |
| Si | 24.9 | 25.3 |

EXAMPLE IV

*Addition of acetaldehyde to tris(trimethylsiloxy)-vinylsilane*

Thirteen and seven-tenths (13.7) grams of acetaldehyde (0.31 mole), 100 grams of tris(trimethylsiloxy)vinylsilane (0.332 mole), and six (6) grams of ditertiarybutyl peroxide (6 percent catalyst of weight of siloxane) were charged to a 300 ml. rocking autoclave. The autoclave was sealed and heated at 135° C. for 4 hours with agitation. Following this, the autoclave was drained, and the reaction mixture fractionated in a short Vigreaux column. Twenty-six and six-tenths (26.6) grams of tris(trimethylsiloxy)-3-oxo-butylsilane $$[(CH_3)_3SiO]_3SiCH_2CH_2COCH_3$$

were recovered (23.4 percent yield.) This material had a boiling point of 68–75° C. at 15–28 mm. Hg, and was identified by its infra-red absorption spectrum and chemical analysis.

ANALYSIS

| Element | Found, Percent | Calculated, Percent |
|---|---|---|
| C | 41.7 | 42.6 |
| H | 9.1 | 9.26 |
| Si | 30.3 | 30.6 |

What is claimed is:
1. A siloxane containing at least one unit of the formula

$$R''-\overset{O}{\overset{\|}{C}}-R'-\underset{}{Si}-O_{\frac{3-m}{2}}^{R_m}$$

wherein R″ is a member of the group consisting of alkyl, aryl, and hydroxy-substituted aryl radicals; R′ is a divalent saturated hydrocarbon radical containing from 2 to 6 carbon atoms; R is a member of the group consisting of alkyl and aryl radicals; and m is an integer having a value of from 0 to 1, inclusive.

2. A siloxane consisting of at least one unit of the formula $$R''-\overset{O}{\overset{\|}{C}}-R'-\underset{}{Si}-O_{\frac{3-m}{2}}^{R_m}$$

and at least one unit of the formula $$R_a-Si-O_{\frac{4-a}{2}}$$

wherein R″ is a member of the group consisting of alkyl, aryl, and hydroxy-substituted aryl radicals; R′ is a divalent saturated hydrocarbon radical containing from 2 to 6 carbon atoms; R is a member of the group consisting of alkyl and aryl radicals; m is an integer having a value of from 0 to 1, inclusive; and a is an integer having a value of from 1 to 3, inclusive.

3. A siloxane consisting of repeating units of the formula

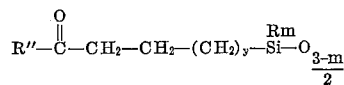

wherein R'' is a member of the group consisting of alkyl, aryl, and hydroxy-substituted aryl radicals; R' is a divalent saturated hydrocarbon radical containing from 2 to 6 carbon atoms; R is a member of the group consisting of alkyl and aryl radicals; $m$ is an integer having a value of from 0 to 1, inclusive.

4. A siloxane consisting of at least one unit of the formula $$R''-\overset{O}{\overset{\|}{C}}-CH_2-CH_2-(CH_2)_y-\underset{}{\overset{R_m}{Si}}-O_{\frac{3-m}{2}}$$

and at least one unit of the formula $$R_a-Si-O_{\frac{4-a}{2}}$$

wherein R'' is a member of the group consisting of alkyl, aryl and hydroxy-substituted aryl radicals; R is a member of the group consisting of alkyl and aryl radicals; $y$ is an integer having a value of from 0 to 4, inclusive; $m$ is an integer having a value of from 0 to 1, inclusive; and $a$ is an integer having a value of from 1 to 3, inclusive.

5. A siloxane as defined in claim 4, wherein $y$ is 0.
6. Tris(trimethylsiloxy)-3-oxo-4-ethyl-hexylsilane.
7. Tris(trimethylsiloxy)-3-oxo-3-phenylpropylsilane.
8. Tris(trimethylsiloxy)-3-oxo-3-ortho-hydroxyphenyl-propylsilane.
9. Tris(trimethylsiloxy)-3-oxo-butylsilane.

References Cited in the file of this patent

UNITED STATES PATENTS

| | | |
|---|---|---|
| 2,533,944 | Ladd | Dec. 12, 1950 |
| 2,591,736 | Sommer | Apr. 8, 1952 |
| 2,803,637 | Speier | Aug. 20, 1957 |

FOREIGN PATENTS

| | | |
|---|---|---|
| 1,118,500 | France | Mar. 19, 1956 |

OTHER REFERENCES

Petrov et al.: "Izvest. Akad. Nauk S.S.S.R., Otdel Kim. Nauk" 1956, p. 1445-7 (51 Chem. Abstr. 8643 (1957)).